US008842268B2

(12) United States Patent
Hayashi

(10) Patent No.: US 8,842,268 B2
(45) Date of Patent: Sep. 23, 2014

(54) MEASURING METHOD FOR CROSSTALK BETWEEN CORES IN MULTI-CORE OPTICAL FIBER

(75) Inventor: Tetsuya Hayashi, Yokohama (JP)

(73) Assignee: Sumitomo Electric Industries, Ltd., Osaka-shi, Osaka (JP)

( * ) Notice: Subject to any disclaimer, the term of this patent is extended or adjusted under 35 U.S.C. 154(b) by 191 days.

(21) Appl. No.: 13/401,992

(22) Filed: Feb. 22, 2012

(65) Prior Publication Data

US 2012/0250008 A1    Oct. 4, 2012

(30) Foreign Application Priority Data

Feb. 25, 2011  (JP) ............... P2011-040523
Nov. 22, 2011  (JP) ............... P2011-255359

(51) Int. Cl.
*G01N 21/00*   (2006.01)
*G01M 11/00*   (2006.01)
*H04B 10/073*  (2013.01)
*H04B 3/46*    (2006.01)
*G02B 6/02*    (2006.01)

(52) U.S. Cl.
CPC ......... *G01M 11/335* (2013.01); *H04B 10/0731* (2013.01); *H04B 3/464* (2013.01); *G02B 6/02042* (2013.01)
USPC ..................................................... 356/73.1

(58) Field of Classification Search
CPC ............ G02B 6/4246; G02B 6/02042; G01M 11/335; H04B 10/0731; H04B 10/25; H02B 3/464; H04Q 2011/0049; H04Q 220/14
USPC ............... 356/73.01, 73.1; 385/126–128, 123
See application file for complete search history.

(56) References Cited

U.S. PATENT DOCUMENTS

| 7,772,541 | B2* | 8/2010 | Froggatt et al. | 250/227.23 |
| 7,781,724 | B2* | 8/2010 | Childers et al. | 250/227.14 |
| 2006/0124842 | A1* | 6/2006 | Goto et al. | 250/227.23 |
| 2013/0188949 | A1* | 7/2013 | Fini et al. | 398/28 |

OTHER PUBLICATIONS

Tetsuya Hayashi, Toshiki Taru, Osamu Shimakawa, Takashi Sasaki, and Eisuke Sasaoka, "Characterization of Crosstalk in Ultra-Low-Crosstalk Multi-Core Fiber," Journal of Lightwave Technology, vol. 30, No. 4, Feb. 15, 2012.*
Tetsuya Hayashi, Toshiki Taru, Osamu Shimakawa, Takashi Sasaki, and Eisuke Sasaoka, "Ultra-Low-Crosstalk Multi-Core Fiber Feasible to Ultra-Long-Haul Transmission," OSA/OFC/NFOEC, Mar. 6-10, 2011, ISBN: 978-1-55752-906-0, http://dx.doi.org/10.1364/NFOEC.2011.PDPC2.*

(Continued)

*Primary Examiner* — Kara E Geisel
*Assistant Examiner* — Violeta A Prieto
(74) *Attorney, Agent, or Firm* — Drinker Biddle & Reath LLP

(57) ABSTRACT

The present invention obtains a statistical distribution of inter-core crosstalk by measuring the inter-core crosstalk of a multi-core optical fiber while changing the wavelength of incident light in a predetermined range including a specific wavelength relative to the multi-core optical fiber, or while changing a polarization state of incident light entering the multi-core optical fiber. According to the present invention, there is no need to measure the crosstalk by rewinding the multi-core optical fiber and changing the phase difference between cores around the zero point of the equivalent propagation constant difference between cores.

5 Claims, 10 Drawing Sheets

(56) References Cited

OTHER PUBLICATIONS

Tetsuya Hayashi, Toshiki Taru, Osamu Shimakawa, Takashi Sasaki, and Eisuke Sasaoka, "Design and fabrication of ultra-low crosstalk and low-loss multi-core fiber," Optics Express 16576, vol. 19, No. 17, Aug. 15, 2011.*

John M. Fini, Benyuan Zhu, Thierry F. Taunay, and Man F. Yan, "Statistics of crosstalk in bent multicore fibers," Optics Express 15122, vol. 18, N014, Jul. 5, 2010.*

Tetsuya Hayashi et al., "Crosstalk Variation on Multi-Core Fibre due to Fibre Bend," Proc. ECOC We.8.F.6, Sep. 19-23, 2010.

* cited by examiner

MEASURING METHOD FOR CROSSTALK BETWEEN CORES IN MULTI-CORE OPTICAL FIBER

BACKGROUND OF THE INVENTION

1. Field of the Invention

The present invention relates to a method of measuring inter-core crosstalk of a multi-core optical fiber.

2. Related Background Art

In recent years, multi-core optical fibers each including a plurality of cores are being actively researched. A multi-core optical fiber is configured, for example, by a plurality of cores being arranged two-dimensionally in a cross section that is perpendicular to the longitudinal direction, and it is known that crosstalk is generated between such plurality of cores. For example, T. Hayashi et al., "Crosstalk Variation of Multi-Core Fiber due to Fiber Bend," in Proc. ECOC'10, We.8.F.6 (2010) (Document 1) shows that the inter-core crosstalk of a multi-core optical fiber is a value including statistical variations.

SUMMARY OF THE INVENTION

The present inventors have examined the foregoing prior art, and as a result, have discovered the following problems. That is, change of the inter-core crosstalk of a multi-core optical fiber occurs at a zero point of the equivalent effective refractive index difference where the equivalent effective refractive index (effective refractive index converted into a linear waveguide in consideration of the bending of the optical fiber) between cores becomes equal, and the change of the crosstalk at the zero point depends on the phase difference between the cores around the zero point. Accordingly, in order to obtain the statistical distribution of the inter-core crosstalk, it is necessary to change the phase difference between cores around the zero point and measure the crosstalk. With the aim of examining the statistical distribution of the inter-core crosstalk, conventionally, since it was necessary to repeat the process of rewinding the optical fiber in order to change the phase difference between the cores and then measuring the inter-core crosstalk, the workload for obtaining the statistical distribution of the inter-core crosstalk was enormous.

The present invention has been developed to eliminate the problems described above. It is an object of the present invention to provide a method of measuring the inter-core crosstalk of a multi-core optical fiber which enables the analysis of the characteristics of the inter-core crosstalk with a simple method.

A method of measuring the inter-core crosstalk of a multi-core optical fiber according to the present invention measures the inter-core crosstalk of a multi-core optical fiber when light with a specific wavelength is incident thereon. In order to achieve the foregoing object, the method of measuring inter-core crosstalk of a multi-core optical fiber according to the present invention comprises an acquisition step of acquiring an inter-core crosstalk value, and a numerical value specifying step of obtaining a specific numerical value related to a statistical distribution of the inter-core crosstalk. In the acquisition step, a set of crosstalk values corresponding to each wavelength is obtained by measuring the inter-core crosstalk of the multi-core optical fiber while changing the wavelength of the light incident on the multi-core optical fiber within a predetermined range including the specific wavelength, or a set of crosstalk values corresponding to each polarization state of the incident light is obtained by measuring the inter-core crosstalk of the multi-core optical fiber while changing the polarization state of the incident light entering the multi-core optical fiber. In the numerical value specifying step, a value selected from a group including an average value, a median value, a mode value, a p-quantile and a variance in a statistical distribution of the inter-core crosstalk in the specific wavelength is obtained by obtaining the statistical distribution of the inter-core crosstalk with the set of crosstalk values acquired in the acquisition step as a population.

In order to achieve the foregoing object, the method of measuring inter-core crosstalk of a multi-core optical fiber according to the present invention is, as a first aspect, a method of measuring inter-core crosstalk of a multi-core optical fiber when light with a specific wavelength is incident thereon, the method including the steps of acquiring a set of crosstalk values corresponding to each wavelength by measuring the inter-core crosstalk of the multi-core optical fiber while changing the wavelength of the light incident on the multi-core optical fiber within a predetermined range including the specific wavelength, and obtaining a value selected from a group including an average value, a median value, a mode value, a p-quantile and a variance in a statistical distribution of the inter-core crosstalk in the specific wavelength by obtaining the statistical distribution of the inter-core crosstalk, with the set of crosstalk values as a population.

In accordance with to the foregoing first aspect, it is possible to obtain the statistical distribution of the inter-core crosstalk by measuring the inter-core crosstalk of the multi-core optical fiber while changing the wavelength of the light incident on the multi-core optical fiber within a predetermined range including the specific wavelength, and there is no need to measure the crosstalk by rewinding the multi-core optical fiber and changing the phase difference between cores around the zero point of the equivalent propagation constant difference between cores. Thus, the characteristics of the inter-core crosstalk can be analyzed with a simpler method.

As a configuration which effectively yields the foregoing effect (as a second aspect that can be applied to the first aspect), specifically, the present invention can adopt a aspect of obtaining the value selected from a group including an average value, a median value, a mode value, a p-quantile and a variance in a statistical distribution of the inter-core crosstalk in the specific wavelength by using crosstalk values within a range in which an absolute value of $S\lambda_{range}$ becomes 4.6 dB or less when the specific wavelength is $\lambda_0$, a wavelength sweep width of the predetermined range is $\lambda_{range}$, a wavelength dependency of the statistical distribution average of the crosstalk is S, and a relation between the wavelength $\lambda$ and the crosstalk value obtained from the measurement is approximated with the following formula:

$$f_{lin}(\lambda) = XT_{lin} \cdot 10^{\frac{S(\lambda-\lambda_0)}{10}}$$

or a relation between the wavelength $\lambda$ and a crosstalk decibel value obtained from the measurement is approximated with the following formula:

$$f_{DB}(\lambda) = XT_{dB} + S(\lambda-\lambda_0)$$

Moreover, as another configuration which effectively yields the foregoing effect (as a third aspect that can be applied to at least one of the first and second aspects), specifically, the present invention can adopt an aspect of obtaining the value selected from a group including an average value; that is, $4\sigma^2$, a median value, a mode value, a p-quantile and a variance in a statistical distribution of the inter-core crosstalk in the specific wavelength when the specific wavelength is $\lambda_0$, the predetermined range is $\lambda_0-\lambda_{dev}$ to $\lambda_0+\lambda_{dev}$, a wavelength dependency of the statistical distribution average of the crosstalk is S, and the statistical distribution of the inter-core crosstalk obtained from the measurement is fitted into the following formula, with $\sigma^2$ as a variable:

$$f(x) = \begin{cases} \dfrac{10}{\ln 10} \dfrac{1}{2S\lambda_{dev}} \left[ \left( \dfrac{1}{x} + \dfrac{1}{2\sigma^2 10^{\frac{S\lambda_{dev}}{10}}} \right) \exp\left( -\dfrac{x}{2\sigma^2 10^{\frac{S\lambda_{dev}}{10}}} \right) - \left( \dfrac{1}{x} + \dfrac{1}{2\sigma^2 10^{\frac{-S\lambda_{dev}}{10}}} \right) \exp\left( -\dfrac{x}{2\sigma^2 10^{\frac{-S\lambda_{dev}}{10}}} \right) \right] & (x > 0) \\ 0 & (x = 0). \end{cases}$$

Moreover, as a fourth aspect that can be applied to at least one of the first to third aspects, the present invention can adopt an aspect where the number of the crosstalk values contained in the population is at least 130 values or more.

Moreover, as a fifth aspect that can be applied to at least one of the first to fourth aspects, the present invention can adopt an aspect where, when the wavelength sweep width of the predetermined range is $\lambda_{range}$, the wavelength sweep width $\lambda_{range}$ is at least 5.2 nm or more.

Moreover, the method of measuring inter-core crosstalk of a multi-core optical fiber according to the present invention is, as a sixth aspect, a method of measuring inter-core crosstalk of a multi-core optical fiber when light with a specific wavelength is incident thereon, the method including the steps of acquiring a set of crosstalk values corresponding to each polarization state of the incident light by measuring the inter-core crosstalk of the multi-core optical fiber while changing the polarization state of the incident light entering the multi-core optical fiber, and obtaining a value selected from a group including an average value, a median value, a mode value, a p-quantile and a variance in a statistical distribution of the inter-core crosstalk in the specific wavelength by obtaining the statistical distribution of the inter-core crosstalk, with the set of crosstalk values as a population.

In accordance with the foregoing sixth aspect, it is possible to obtain the statistical distribution of the inter-core crosstalk by measuring the inter-core crosstalk of the multi-core optical fiber while changing the polarization state of the incident light entering the multi-core optical fiber, and there is no need to measure the crosstalk by rewinding the multi-core optical fiber and changing the phase difference between cores around the zero point of the equivalent propagation constant difference between cores. Thus, the characteristics of the inter-core crosstalk can be analyzed with a simpler method.

Here, a configuration which effectively yields the foregoing effect (as a seventh aspect that can be applied to the sixth aspect), specifically, the present invention can adopt an aspect of acquiring the set of crosstalk values by changing the polarization state of the incident light so that it is distributed uniformly on a Poincare sphere.

DESCRIPTION OF THE PREFERRED EMBODIMENTS

Figure 1:
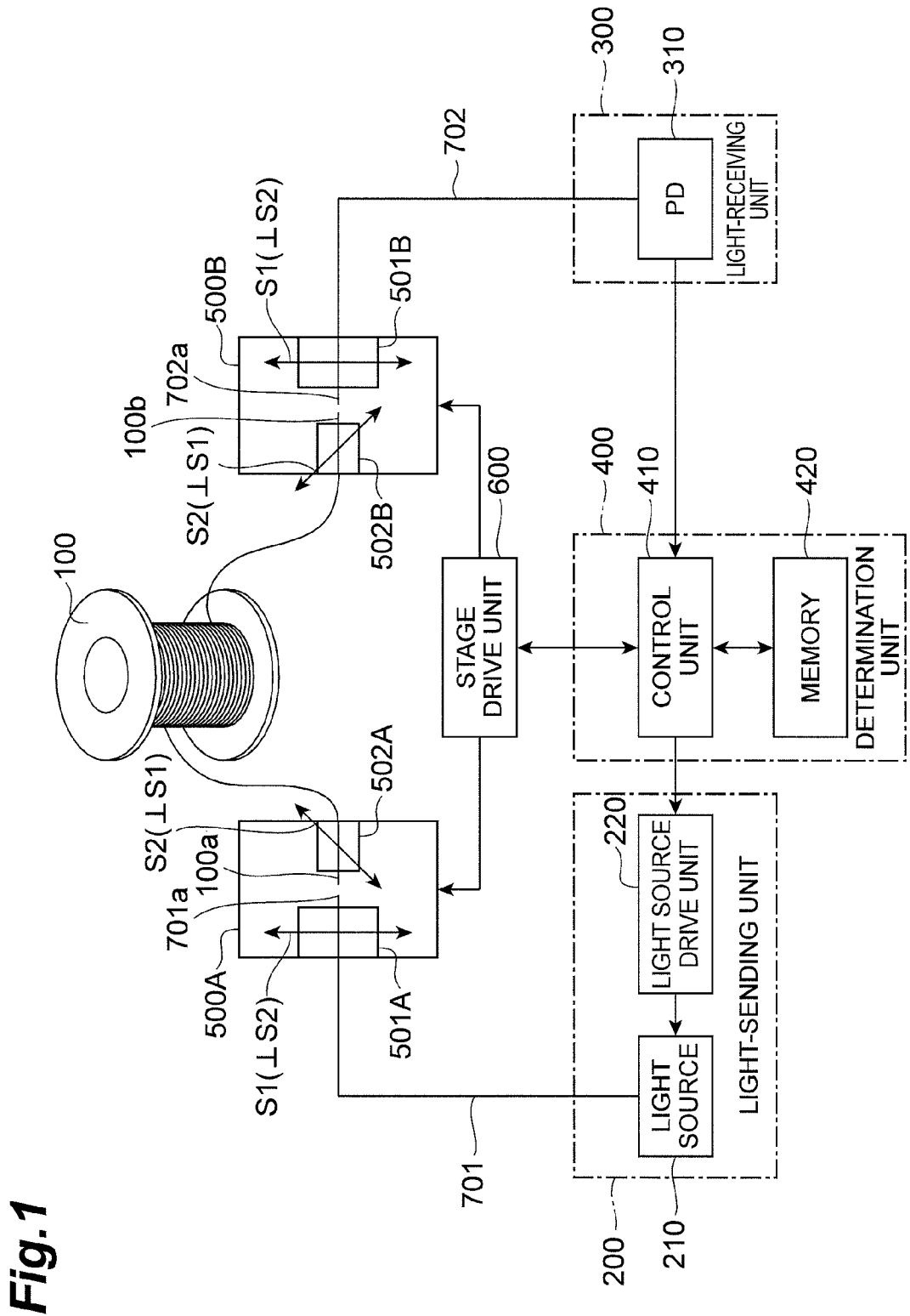
FIG. 1 is a diagram showing an example of the device configuration for implementing the method of measuring the inter-core crosstalk of a multi-core optical fiber according to the present invention.

In the following, embodiments for implementing the present invention will be explained in detail with reference to the appended drawings. In this embodiment, the problems related to conventional crosstalk are foremost indicated, and the embodiments of the present invention are subsequently explained. Note that the same elements in the explanation of the drawings are given the same reference numeral and the redundant explanation thereof is omitted.

The crosstalk of a multi-core optical fiber is foremost explained. A multi-core optical fiber is configured by a plurality of cores being arranged two-dimensionally in a cross section orthogonal to the longitudinal direction. Here, when giving consideration to the bending or twisting of the fiber, the crosstalk from core m to core n can be represented with the following formula (1) in a mode-coupling equation when considering a case of single-polarization.

$$\frac{\partial A_n(z)}{\partial z} = -j\kappa_{nm}A_m(z)\exp(-j\{\phi_m(z) - \phi_n(z)\}) \tag{1}$$

Provided that $A_n$ is a complex electric field amplitude of the core n, $\kappa_{nm}$ is a coupling coefficient from the core m to the core n, $\phi$ is as shown in the following formula (2), $\beta$ is a propagation constant of the respective cores, $D_{nm}$ is a center-to-center spacing of the core n and the core m, R is a bending radius of the fiber, and $\theta_n$ is an angle that is formed by the core n with the radial direction of the bending of the fiber with the core m as the origin.

$$\begin{cases} \phi_m(z) = \beta_m z \\ \phi_n(z) = \int_0^z \beta_n \left\{1 + \frac{D_{nm}}{R}\cos\theta_n(z')\right\} dz' \end{cases} \quad (2)$$

Here, the formula (3) contained in the foregoing formula (2) is the equivative propagation constant (equivalent propagation constant) of the core n in which the bending waveguide was converted into a linear waveguide with the core m as the reference. Here, since the core m is used as the reference, the equivalent propagation constant of the core m is $\beta_m$.

$$\beta_n \left\{1 + \frac{D_{nm}}{R}\cos\theta_n(z')\right\} \quad (3)$$

Since the change of the dominant crosstalk occurs at a point where the equivalent propagation constant becomes equal (zero point of the equivalent propagation constant difference) between the two cores contained in the multi-core optical fiber, the crosstalk change in the longitudinal direction of the fiber can be modeled as shown in the following formula (4).

$$A_n(n_{zero}+1) = A_n(n_{zero}) + K\exp(j\phi_{random})A_m(n_{zero}) \quad (4)$$

Note that $A_n(n_{zero})$ is a complex electric field amplitude of the core n after the zero point of the $n_{zero}$-th equivalent propagation constant difference, K is a coefficient of the dominant crosstalk change, and $\phi_{random}$ is a parameter corresponding to the phase difference between the cores at the respective zero points. Note that $\phi_{random}$ is treated as a random value because, with an actual optical fiber, it will change considerably even when the bending diameter or twisting manner changes slightly.

Here, the following formula (5) follows the probability distributions respectively having the variance of $\sigma^2 = K^2/2$.

$$\Re\{K\exp(j\phi_{random})A_m(n_{zero})\} \Im\{K\exp(j\phi_{random})A_m(n_{zero})\} \quad (5)$$

Accordingly, if $n_{zero}$ is sufficiently large, the values shown in the following formula (6) respectively distribute the normal distribution having the formula (7) as the probability distribution, based on the central limit theorem.

$$\Re\{A_n(n_{zero})\} \quad (6)$$
$$\Im\{A_n(n_{zero})\}$$

$$\sigma^2 = \frac{K^2}{2} \sum_{k=0}^{n_{zero}} |A_m(k)|^2 \quad (7)$$

Here, if the inter-core crosstalk is sufficiently small as shown in the formula (8) and the multi-core optical fiber is twisted in the longitudinal direction at a certain twist rate, the relation of the formula (9) is derived.

$$A_m(n_{zero}) \approx 1 \quad (8)$$

$$\sigma^2 = \frac{\kappa_{nm}^2}{\beta_n} \frac{R}{D_{nm}} L_F \quad (9)$$

Here, the variance in the distribution of the formula (6) is not dependent on the twist rate of the multi-core optical fiber, and it can be seen that it is dependent on the coupling coefficient, the propagation constant, the bending radius of the fiber, the center-to-center spacing of the cores, and the fiber length. However, in reality, since the multi-core optical fiber has two polarization modes, the formulas (7) and (9) can respectively be converted into the following formulas (10) and (11).

$$\sigma^2 = \frac{K^2}{4} \sum_{k=0}^{n_{zero}} |A_m(k)|^2 \quad (10)$$

$$\sigma^2 = \frac{1}{2} \frac{\kappa_{nm}^2}{\beta_n} \frac{R}{D_{nm}} L_F \quad (11)$$

Here, $|A_n(n_{zero})|^2/\sigma^2$ is distributed based on a chi-squared distribution with 4 degrees of freedom.

Moreover, $|A_n(n_{zero})|^2$ is distributed with the following formula (12) which is a chi-squared distribution with 4 degrees of freedom scaled at $1/\sigma^2$ $$f(x) = \frac{x}{4\sigma^4} \exp\left(-\frac{x}{2\sigma^2}\right) \quad (12)$$

and the average value $XT_\mu$ of the distribution is $4\sigma^2$.

Here, in order to actually measure the crosstalk and obtain the statistical distribution having the foregoing variance, it can be understood that it is necessary to randomly vary the phase difference $\phi_{random}$ between the cores at the respective zero points for each measurement in the fiber. As described above, since $\phi_{random}$ will change considerably even when the bending diameter or twisting manner of the multi-core optical fiber changes slightly, conventionally, the multi-core optical fiber was rewound for each measurement in order to vary the bending diameter and twisting manner at the respective positions of the multi-core optical fiber so as to vary the $\phi_{random}$ and obtain a histogram of the crosstalk, and thereby acquire the statistical distribution of the crosstalk.

Nevertheless, the rewinding of the multi-core optical fiber requires much time and manpower, and it is not easy to increase the sample count of the histogram, and the increase of workload was a problem.

Thus, in this embodiment, proposed is a method of measuring the wavelength characteristics of the crosstalk as a method of acquiring the histogram of the statistical distribution of the crosstalk without having to measure the crosstalk by repeating the rewinding process of the multi-core optical fiber.

Figure 2:
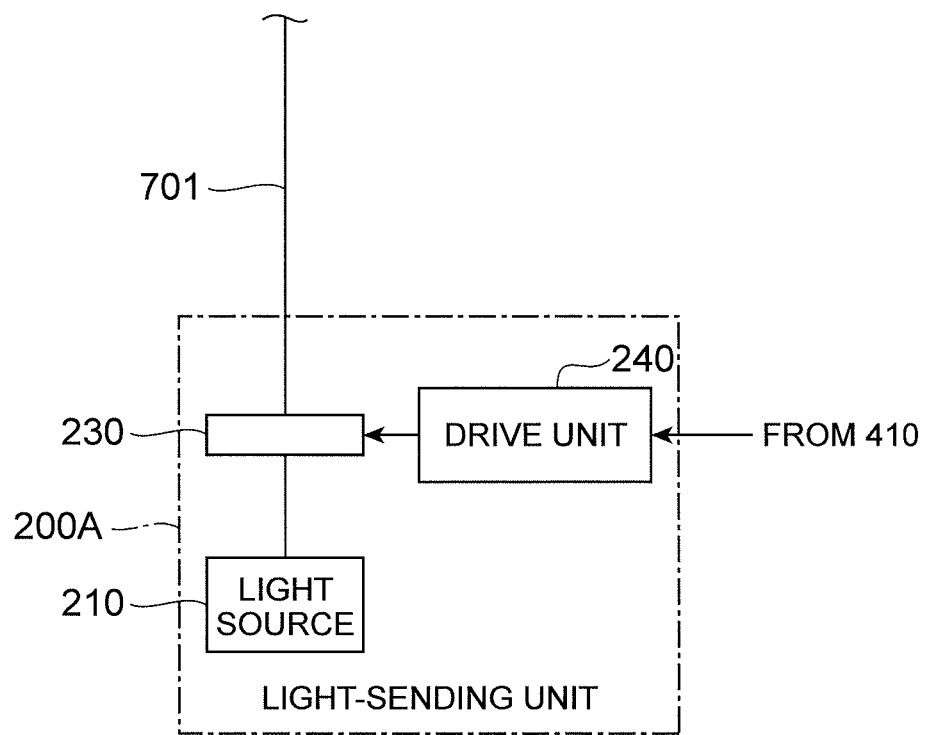
FIG. 2 is a diagram showing another example of the device configuration for implementing the method of measuring the inter-core crosstalk of a multi-core optical fiber according to the present invention.

FIG. 1 is a diagram showing an example of a specific device configuration for implementing the method of measuring the inter-core crosstalk of a multi-core optical fiber according to the present invention. Moreover, FIG. 2 is a diagram showing another example of a specific device configuration for implementing the method of measuring the inter-core crosstalk of a multi-core optical fiber according to the present invention. Note that, although only a light-sending unit 200A is disclosed in FIG. 2, the remaining configuration of the measuring device to which the light-sending unit 200A is applied is the same as the device configuration of FIG. 1.

The measuring device shown in FIG. 1 includes an adjustment mechanism for mechanically adjusting the light entering state and the light emitting state to and from a multi-core optical fiber 100 to be measured, a light-sending unit 200 for transmitting a measurement beam, a light-receiving unit 300 for receiving the crosstalk light, and a determination unit 400.

The adjustment mechanism includes a light-sending-side stage 500A to which is fixed an entrance end 100a of the multi-core optical fiber 100 to be measured, a light-receiving-side stage 500B to which is fixed an emission end 100b of the multi-core optical fiber 100, and a stage drive unit 600 for individually performing the attitude control of these stages 500A, 500B. The light-sending unit 200 includes a light source 210, and a light source drive unit 220 for sweeping the wavelength of the measurement beam emitted from the light source 210 in a predetermined range. The measurement beam outputted from the light source 210 is guided to the light-sending optical fiber 701, and the emission end 701a of the light-sending optical fiber 701 is fixed to the light-sending-side stage 500A. The light-receiving unit 300 includes a light-receiving element 310 (PD) for receiving the crosstalk light emitted from the emission end 100b of the multi-core optical fiber 100 via the light-receiving optical fiber 702 in which the entrance end 702a is fixed to the light-receiving-side stage 500B. The determination unit 400 includes a control unit 410 for performing the drive control of the stage drive unit 600 and the light source drive unit 220, and acquiring the measurement value from the PD 310 and implementing the measuring method of this embodiment, and a memory 420 for storing various measurement data and the like.

The light-sending-side stage 500A comprises a seating 501A capable of moving along the horizontal direction shown with arrow S1 in a state of retaining the emission end 701a of the light-sending optical fiber 701, and a seating 502A capable of moving in the vertical direction shown with arrow S2(⊥S1) which is orthogonal to the arrow S1 in a state of retaining the entrance end 100a of the multi-core optical fiber 100. The stage drive unit 600 optically connects, for example, the emission end 701a of the light-sending optical fiber 701 and the core m disposed on the entrance end 100a of the multi-core optical fiber 100 by moving the seating 501A a predetermined amount in the horizontal direction, and moving the seating 502A a predetermined amount in the vertical direction.

Meanwhile, the light-receiving-side stage 500B comprises a seating 501B capable of moving along the horizontal direction shown with arrow S1(⊥S2) in a state of retaining the entrance end 702a of the light-sending optical fiber 702, and a seating 502B capable of moving in the vertical direction shown with arrow S2(⊥S1) which is orthogonal to the arrow S1 in a state of retaining the emission end 100b of the multi-core optical fiber 100. In accordance with an instruction signal from the control unit 410, the stage drive unit 600 optically connects, for example, the entrance end 702a of the light-sending optical fiber 702 and the core n disposed on the emission end 100b of the multi-core optical fiber 100 by moving the seating 501B a predetermined amount in the horizontal direction, and moving the seating 502B a predetermined amount in the vertical direction. Note that, as the adjustment mechanism, without limitation to the configuration including the stage drive unit 600 and the like shown in FIG. 1, for example, it is also possible to apply a coupling device (spatial optical system, optical fiber coupler or the like) capable of individually inputting and outputting light to and from the respective cores. In the foregoing case, the coupling device and the fibers 701, 702 may be connected manually without depending on the light-sending-side stage 500A and the light-receiving-side stage 500B. Based on this kind of adjustment mechanism, it is possible to select the core to which the measuring light should enter via the emission end 701a of the light-sending optical fiber 701 among the plurality of cores disposed on the entrance end 100a of the multi-core optical fiber 100 to be measured, and select the core to receive the crosstalk light via the entrance end 702a of the light-receiving optical fiber 702 among the plurality of cores disposed on the emission end 100b of the multi-core optical fiber 100. The control unit 410 can acquire the set of crosstalk values between cores as a result of the entrance-side core m and the emission-side core n being arbitrarily selected while changing the wavelength or polarization state of the measurement beam.

The foregoing light-sending unit 200 functions as light source means for emitting a measurement beam while changing the wavelength, but in substitute for this light-sending unit 200, the light-sending unit 200A which emits a measurement beam while changing the polarization state of the measurement beam may also be applied to the measuring device shown in FIG. 1. Note that the light-sending unit 200A of FIG. 2 comprises, in addition to the light source 210, a polarization element 230 for changing the polarization state of the light emitted from the light source 210 into the intended state, and a drive unit 240 for performing attitude control of the polarization element 230 according to instructions from the control unit 430. Light that passed through the polarization element 230 among the light emitted from the light source 210 is guided as the measurement beam to the light-sending optical fiber 701.

The formula (2) can be rewritten as the following formula (13) by using the relation of $\beta = 2\pi/\lambda \cdot n_{eff}$.

$$\begin{cases} \phi_m(z) = \frac{2\pi}{\lambda} n_{eff,m} z \\ \phi_n(z) = \frac{2\pi}{\lambda} n_{eff,n} \int_0^z \left\{ 1 + \frac{D_{nm}}{R} \cos\theta_n(z') \right\} dz' \end{cases} \quad (13)$$

Here, when assuming $\partial_n(z) = \gamma z$, $n_{eff,m} = n_{eff,n}$, the phase difference between the cores of the multi-core optical fiber can be represented as shown in the following formula (14).

$$\begin{aligned} \delta\phi_{nm}(z, \lambda) &= \phi_m(z) - \phi_n(z) \\ &= \frac{2\pi}{\lambda} n_{eff,m} z - \frac{2\pi}{\lambda} n_{eff,n} \left( z + \frac{D_{nm}}{\gamma R} \sin \gamma z \right) \\ &= -\frac{2\pi}{\lambda} n_{eff,n} \frac{D_{nm}}{\gamma R} \sin \gamma z \end{aligned} \quad (14)$$

Here, when using the assumption, since $\gamma z = \pi(n_{zero} - 1/2)$ holds at the zero point of the equivalent propagation constant difference, the foregoing formula (14) can be rewritten and represented as the following formula (15).

$$\delta\phi_{nm}(\lambda) = \pm \frac{2\pi}{\lambda} n_{eff,n} \frac{D_{nm}}{\gamma R} \quad (15)$$

Figure 3:
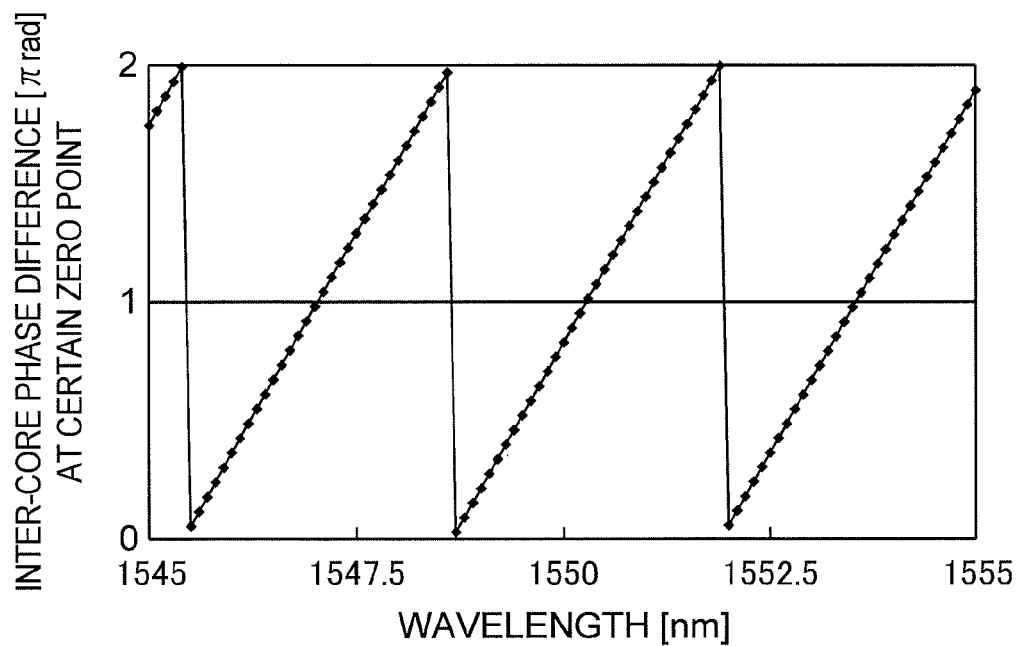
FIG. 3 is a diagram explaining the inter-core phase difference at a zero point.

Here, FIG. 3 shows an example of the relation of the wavelength and $\delta\phi_{nm}(\lambda)$ when $n_{eff,n}$ is 1.444, $\gamma$ is $2\pi \cdot 0.1$ [rad/m], $D_{nm}$ is 45 μm, and R is 140 mm. As shown in FIG. 3, in a wavelength range of 10 nm, the inter-core phase difference at the zero point changes about three times. Accordingly, it can be understood that a sufficient change of the phase difference can be attained by changing the wavelength to be used in the measurement.

Note that, in the foregoing explanation, since the conditions of R being constant and $\theta_n(z) = \gamma z$ were used to simplify the explanation, the phase difference at the zero point of the equivalent propagation constant difference is converged into the two patterns of the formula (15). Nevertheless, with an actual multi-core optical fiber, R is not an ideal constant along the longitudinal direction, and the twist rate is also not constant. Thus, based on the change of the wavelength, the phase difference between the cores will change at the zero point of the respective equivalent propagation constant differences in the longitudinal direction of the fiber. Accordingly, the crosstalk value also takes on a varied value according to the statistical distribution.

Here, what could become a problem upon measuring the inter-core crosstalk of the multi-core optical fiber while changing (sweeping) the wavelength of the light incident on the multi-core optical fiber within a predetermined range including the specific wavelength and obtaining the statistical distribution of the crosstalk based on the foregoing results, is the wavelength dependency of the coupling coefficient.

Figure 4:
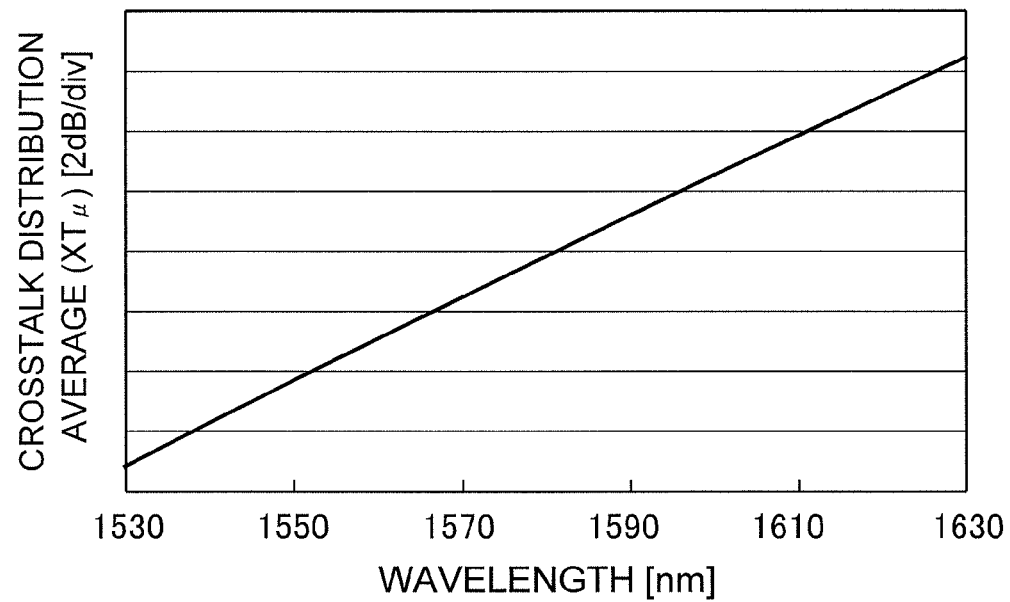
FIG. 4 is a diagram showing the average of crosstalk distribution upon changing the wavelength.

As one example, the relation between the wavelength and the average value $XT_\mu$ of the crosstalk distribution in relation to the wavelength dependency of the coupling coefficient of the multi-core optical fiber is shown in FIG. 4.

The logarithmic expression of $XT_\mu$ is basically linear relative to the wavelength. This fiber is a fiber in which the wavelength dependency of the coupling coefficient is large, but even still the inclination of $10 \cdot \log_{10} XT_\mu$ relative to the wavelength is inhibited to approximately 0.14 dB/nm or less as shown in FIG. 4.

Here, when the $XT_\mu$ in the reference wavelength $\lambda_0$ is $XT_{\mu,\lambda_0}$, and the logarithmic expression of the average value of the crosstalk distribution is linear relative to the wavelength, this can be represented as the following formula (16). Note that, here, S is the coefficient of $XT_\mu$ relative to the wavelength.

$$XT_{\mu,\lambda_0} \cdot 10^{\frac{S(\lambda-\lambda_0)}{10}} \tag{16}$$

Here, when incident light within a wavelength range of $\pm\lambda_{dev}$ to a reference wavelength of $\lambda_0$ (from $\lambda_0-\lambda_{dev}$ to $\lambda_0+\lambda_{dev}$) is irradiated, the wavelength sweep width $\lambda_{range}$ is $2\lambda_{dev}$, and $XT_\mu$ changes in a range of the following formula (17).

$$XT_{\mu,\lambda_0} \cdot 10^{-\frac{S\lambda_{dev}}{10}} \leq XT_\mu \leq XT_{\mu,\lambda_0} \cdot 10^{\frac{S\lambda_{dev}}{10}} \tag{17}$$

Specifically, $XT_\mu$ changes in a range of $\pm S\lambda_{dev}$ dB.

Here, the average value $XT_{\mu, meas}$ of the crosstalk distribution measured by the wavelength sweep can be presented as shown in the following formula (18).

$$XT_{\mu,meas} = 4\sigma_0^2 \frac{5\left(10^{\frac{S\lambda_{dev}}{10}} - 10^{-\frac{S\lambda_{dev}}{10}}\right)}{S\lambda_{dev}\ln 10}$$

$$= XT_{\mu,\lambda_0} \frac{5\left(10^{\frac{S\lambda_{dev}}{10}} - 10^{-\frac{S\lambda_{dev}}{10}}\right)}{S\lambda_{dev}\ln 10} \tag{18}$$

Thus, the difference between the average value $XT_{\mu, meas}$ of the crosstalk distribution measured by the wavelength sweep and the average value $XT_{\mu, \lambda_0}$ of the crosstalk distribution in the center wavelength of the wavelength sweep is dependent on $S\lambda_{dev}$. In other words, the foregoing difference does not depend on the width of the wavelength range in which the wavelength sweep was performed, and depends on the variation of the average value of the crosstalk distribution in the wavelength sweep range or the variation of the coupling coefficient in the wavelength sweep range.

Figure 5:
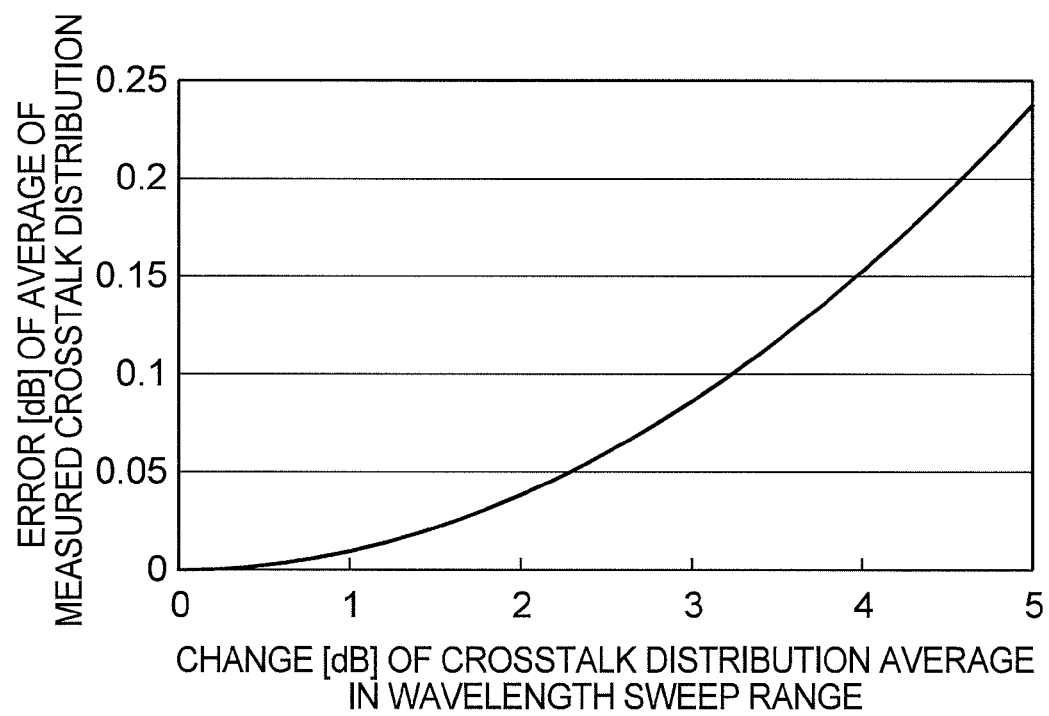
FIG. 5 is a diagram showing the correspondence of the change in the average value of the crosstalk distribution upon changing the wavelength and the error in the average of the measured crosstalk distribution.

Here, FIG. 5 shows the relation of the variation $S\lambda_{range} = S\lambda_{dev}$ of the average value of the crosstalk distribution in the wavelength sweep range and the decibel level of the difference between $XT_{\mu, meas}$ and $XT_{\mu, \lambda_0}$. When considering the distribution shape of the crosstalk, the crosstalk value in the foregoing wavelength range varies at 20 dB or more. Thus, when obtaining the average value thereof, if the error can be kept to 0.2 dB or less, it shows high measurement accuracy, and, if the change of $XT_\mu$ in the wavelength sweep range is approximately 4.6 dB or less, the average value $XT_{\mu, \lambda_0}$ of the statistical distribution of the crosstalk in the specific wavelength $\lambda_0$ can be measured with sufficient accuracy. Moreover, similarly, it is also possible to obtain the value selected from a group consisting of an average value, a median value, a mode value, a p-quantile and a variance in the statistical distribution.

Moreover, when the measured relation of the wavelength and the crosstalk is approximated with the following formula (19a), or when the measured relation of the wavelength and the crosstalk decibel value is approximated with the following formula (19b), the average value $XT_{\mu, \lambda_0}$ of the statistical distribution of the crosstalk in the specific wavelength $\lambda_0$ can be measured with sufficient accuracy if $2S\lambda_{dev}$ is approximately 4.6 dB or less.

$$f_{lin}(\lambda) = XT_{lin} \cdot 10^{\frac{S(\lambda-\lambda_0)}{10}} \tag{19a}$$

$$f_{dB}(\lambda) = XT_{dB} + S(\lambda - \lambda_0) \tag{19b}$$

Figure 6:
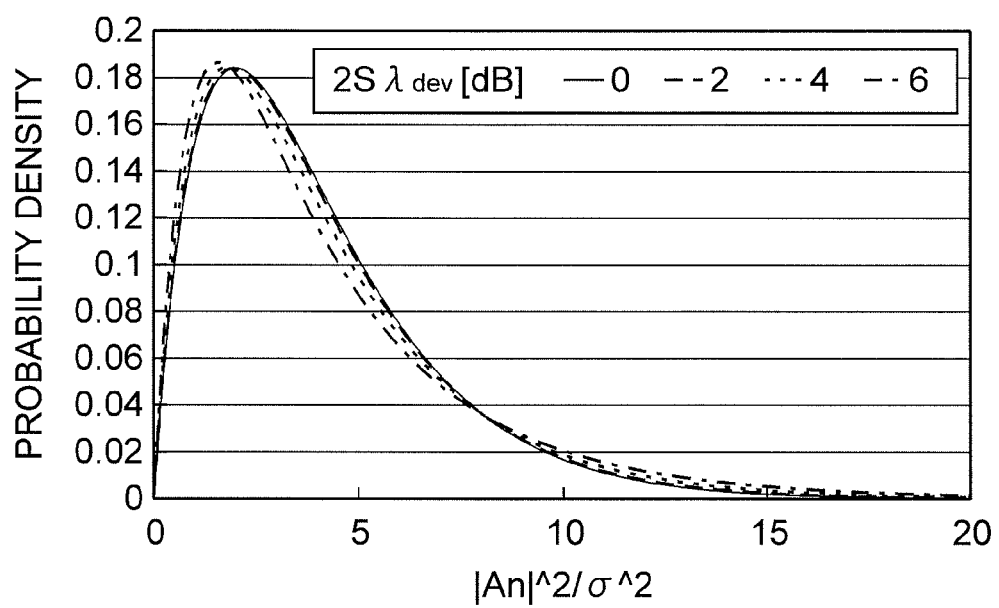
FIG. 6 is a diagram explaining the difference in the probability distribution shape upon changing the variation of the average value of the crosstalk distribution in the wavelength sweep range.

Moreover, when $2S\lambda_{dev}$ is similarly approximately 4.6 dB or less, the shape of the crosstalk probability distribution itself will also sufficiently coincide with the probability distribution shape when $2S\lambda_{dev}$ is 0 dB; that is, with the wavelength $\lambda_0$. FIG. 6 shows the difference in the probability distribution shape based on the difference in $2S\lambda_{dev}$. It can be seen that the probability distribution shape changes according to the change of $2S\lambda_{dev}$.

In addition, even in cases where $2S\lambda_{dev}$ is greater than approximately 4.6 dB, by obtaining the probability density distribution with the measured crosstalk value as the population, and fitting it with the probability density function represented in the following formula (20), $XT_{\mu, \lambda_0}$, specifically, $XT_\mu = 4\sigma^2$ with the reference wavelength $\lambda_0$ can be obtained.

$$f(x) = \begin{cases} \frac{10}{\ln 10} \frac{1}{2S\lambda_{dev}} \left[ \left(\frac{1}{x} + \frac{1}{2\sigma^2 10^{-\frac{S\lambda_{dev}}{10}}}\right) \exp\left(-\frac{x}{2\sigma^2 10^{-\frac{S\lambda_{dev}}{10}}}\right) - \left(\frac{1}{x} + \frac{1}{2\sigma^2 10^{\frac{S\lambda_{dev}}{10}}}\right) \exp\left(-\frac{x}{2\sigma^2 10^{\frac{S\lambda_{dev}}{10}}}\right) \right] & (x > 0) \\ 0 & (x = 0) \end{cases} \tag{20}$$

$$f(x) = \begin{cases} \frac{10}{\ln 10} \frac{1}{2S\lambda_{dev}} \left[ \begin{pmatrix} \frac{1}{x} + \frac{1}{2\sigma^2 10^{-\frac{S\lambda_{dev}}{10}}} \end{pmatrix} \exp \\ \begin{pmatrix} -\frac{x}{2\sigma^2 10^{-\frac{S\lambda_{dev}}{10}}} \end{pmatrix} - \\ \begin{pmatrix} \frac{1}{x} + \frac{1}{2\sigma^2 10^{-\frac{S\lambda_{dev}}{10}}} \end{pmatrix} \exp \\ \begin{pmatrix} -\frac{x}{2\sigma^2 10^{-\frac{S\lambda_{dev}}{10}}} \end{pmatrix} \end{cases} & (x > 0) \\ 0 & (x = 0) \end{cases} \quad (20)$$

Figure 7:
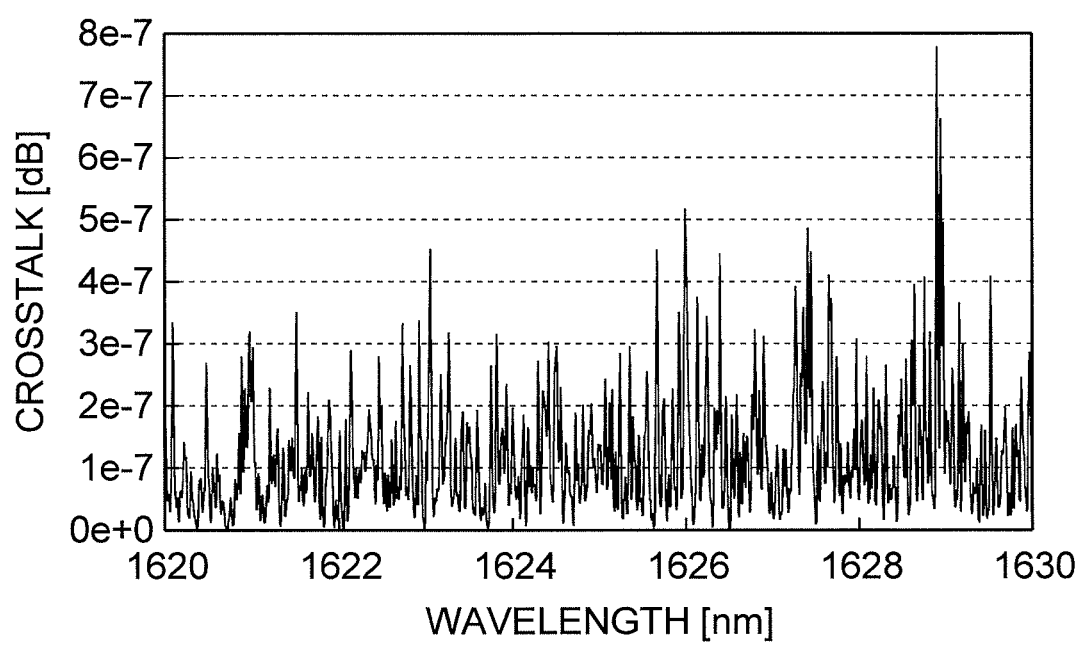
FIG. 7 is a diagram showing the results upon performing measurement using a multi-core optical fiber.
Figure 8:
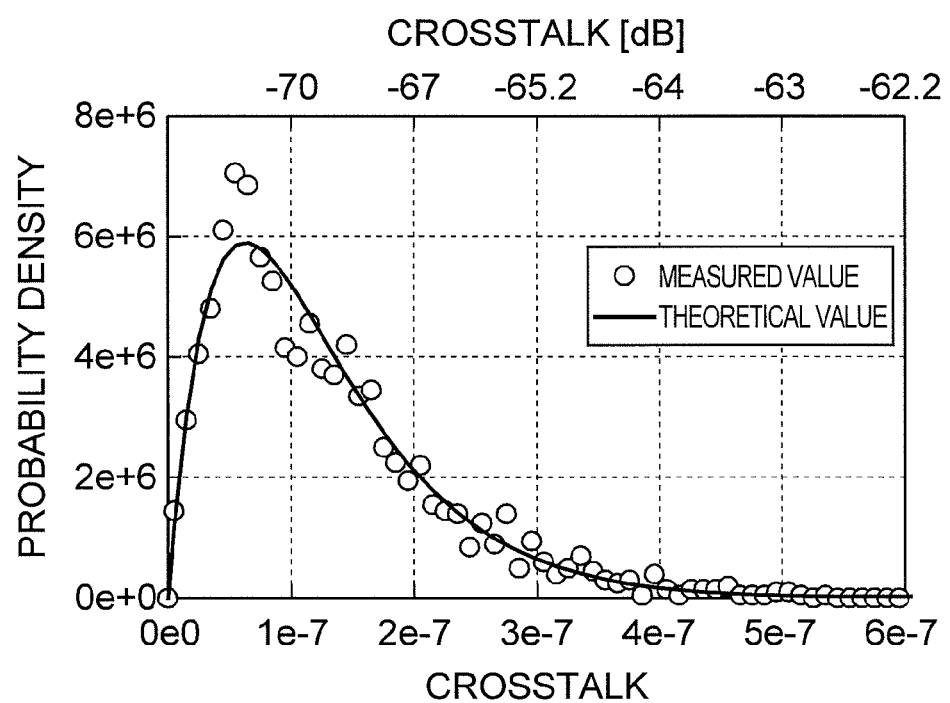
FIG. 8 is a diagram showing the results upon plotting the measurement results shown in FIG. 7 as the probability distribution.

Here, FIG. 7 shows the results of actually measuring the inter-core crosstalk of the multi-core optical fiber while changing the wavelength of the incident light in a predetermined range including the specific wavelength. The measured wavelength range is 1620 to 1630 nm, and 2001 points were measured in the wavelength range of 10 nm. FIG. 8 shows the results of plotting the crosstalk values as the probability distribution. As shown in FIG. 8, it can be seen that the probability distribution reliably follows the formula (12) as described above.

Here, the conditions for sufficiently reducing the measurement variation of the XT average value are examined from the actually measured XT spectrum.

Figure 9:
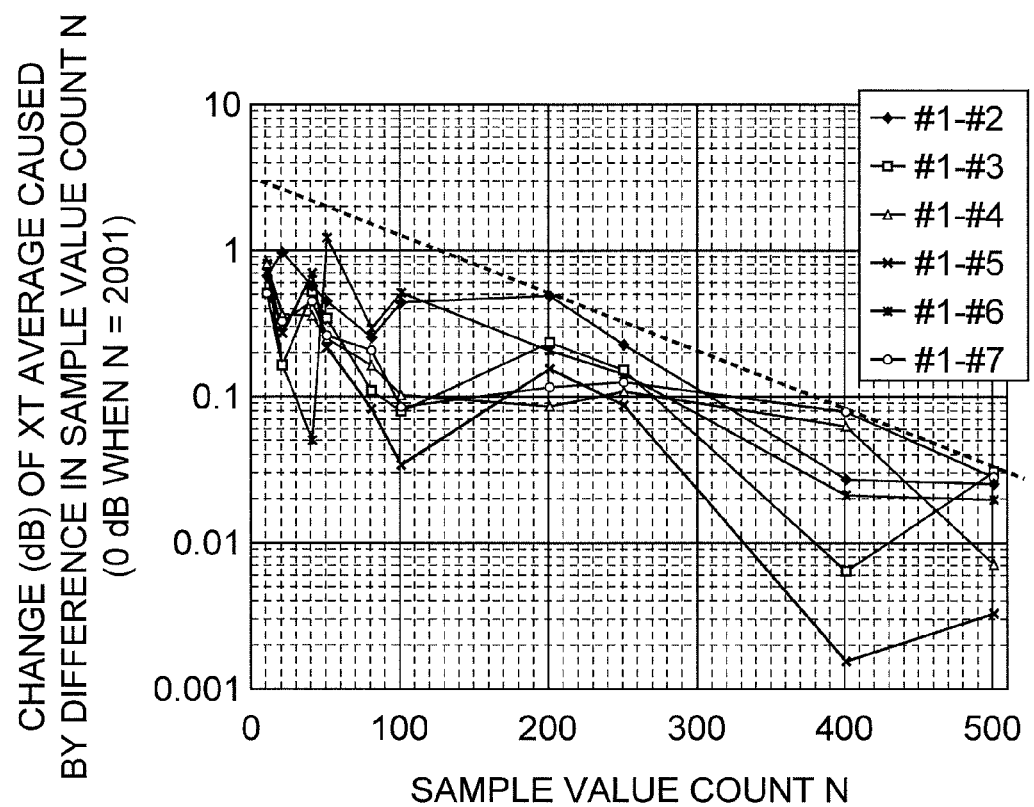
FIG. 9 is a diagram showing the change of the XT average value upon changing the sample value count N.

Foremost, FIG. 9 shows the absolute value of the change in the XT average value when $\lambda_{range}$ is fixed at 10 nm and the sample value count N is changed. The respective groupings shown in FIG. 9 are data related to the XT between center core #1 and outer peripheral cores #2 to 7, and uses, as the reference, the XT average value when measuring the respective groupings where sample value count N=2001. The solid line in FIG. 9 shows the XT average value based on the respective measured values of the center core #1 and the outer peripheral cores #2 to 7, and the broken line in FIG. 9 is the line showing the upper limit of variation between the respective measured values and the XT average value. Here, it can be seen from FIG. 9 that approximately N≥130 is required for the absolute value of the change in the XT average value to be 1 dB or less. Similarly, approximately N≥200 is required for the absolute value of the change in the XT average value to be 0.5 dB or less, approximately N≥300 is required to be 0.2 dB or less, and approximately N≥380 is required to be 0.1 dB or less.

Figure 10:
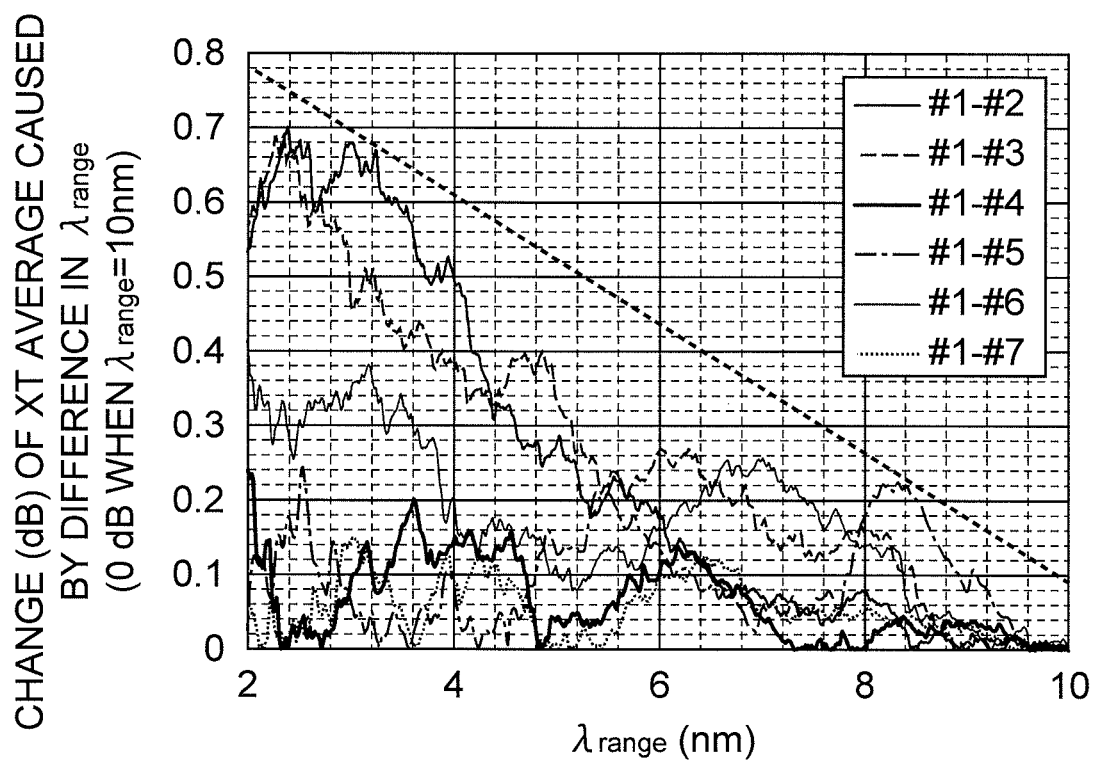
FIG. 10 is a diagram showing the change of the XT average value upon changing the $\lambda_{range}$.

Next, FIG. 10 shows the change of the XT average value upon changing $\lambda_{range}$. In FIG. 10, data in which the wavelength step was measured as 5 pm is used. N will change according to the change of $\lambda_{range}$, but N in $\lambda_{range}$=2 nm is 401, and, based on the results of FIG. 9, the change of the XT average value caused by the change of N is 0.1 dB or less. Here, when the XT average value is referenced at $\lambda_{range}$=10 nm, approximately $\lambda_{range}$≥5.2 nm is required for the absolute value of the change in the XT average value to be 0.5 dB or less, and approximately $\lambda_{range}$≥8.8 nm is required to be 0.2 dB or less.

Here, the formula (4) can be represented as the following formula (21) when considering two polarization modes.

$$\begin{bmatrix} A_{n,x}(n_{zero} + 1) \\ A_{n,y}(n_{zero} + 1) \end{bmatrix} = T_n(n_{zero}) \begin{bmatrix} A_{n,x}(n_{zero}) \\ A_{n,y}(n_{zero}) \end{bmatrix} + K\exp(j\phi_{random})T_m(n_{zero}) \begin{bmatrix} A_{m,x}(n_{zero}) \\ A_{m,y}(n_{zero}) \end{bmatrix} \quad (21)$$

Here, $A_{n,x}(n_{zero})$ is the x-axis polarization component of a complex electric field amplitude of the core n after the zero point of the $n_{zero}$-th equivalent propagation constant difference, and $A_{n,y}(n_{zero})$ is the y-axis polarization component. Specifically, these are a Jones vector in the following formula (22).

$$\begin{bmatrix} A_{m,x}(n_{zero}) \\ A_{m,y}(n_{zero}) \end{bmatrix} \quad (22)$$

$T_n(n_{zero})$ is the Jones matrix of the core n from immediately after the zero point of the $n_{zero}$-th equivalent propagation constant difference to immediately before the zero point of the $n_{zero}$+1st equivalent propagation constant difference.

Here, the formula (23) is distributed based on the probability distribution of equal variance.

$$\Re\{A_{n,x}(n_{zero})\}, \Im\{A_{n,y}(n_{zero})\}, \Re\{A_{n,y}(n_{zero})\}, \Im\{A_{n,y}(n_{zero})\} \quad (23)$$

Moreover, even if the Jones vector is multiplied by the Jones matrix, only the polarization state; specifically the polarizing direction or the phase of the respective polarization components of the x-axis and the y-axis will change, and the variance of the probability distribution of the formula (23) will not change. It is natural for the Jones matrix to be different in the respective cores, and the Jones matrix between the respective zero points is also generally different in an actual multi-core optical fiber. Here, when the polarization state of the Jones vector to be multiplied to the Jones matrix changes, the polarization state of the Jones vector to be obtained as the product of the Jones matrix and the Jones vector will also change as a matter of course, and an amount of relative change of Jones vector polarization state between input and output is also changed. In other words, if the polarization state of the input is changes, the polarizing direction between the input and the output will change, and the phase of the respective polarization components of the x-axis and the y-axis will also change.

Accordingly, the phase difference between the core n and the core m of the respective polarization components of the x-axis and the y-axis at the respective zero points can be changed to a polarization state of the input light.

Thus, it is possible to adopt the method of measuring the polarization state dependency of the crosstalk as the method of acquiring the histogram of the statistical distribution of the inter-core crosstalk of the multi-core optical fiber without requiring any rewinding.

Here, if the change in the value of the crosstalk is measured while changing the polarization state of the incident light so that it is distributed uniformly on a Poincare sphere, the statistical distribution of the measured value will become the crosstalk distribution explained above.

As described above, according to the method of measuring the inter-core crosstalk of the multi-core optical fiber of this embodiment, it is possible to obtain the statistical distribution of the inter-core crosstalk by measuring the inter-core crosstalk of the multi-core optical fiber while changing the wavelength of the light incident on the multi-core optical fiber within a predetermined range including the specific wavelength. Moreover, it is also possible to obtain the statistical distribution of the inter-core crosstalk by measuring the inter-core crosstalk of the multi-core optical fiber while changing the polarization state of the incident light entering the multi-core optical fiber. In either of the foregoing methods, there is no need to measure the crosstalk by rewinding the multi-core optical fiber and changing the phase difference between cores around the zero point of the equivalent propagation constant difference between cores. Thus, the characteristics of the inter-core crosstalk can be analyzed with a simpler method.

In accordance with the present invention described above, it is possible to provide a method of measuring the inter-core crosstalk of a multi-core optical fiber which enables the analysis of the characteristics of the inter-core crosstalk with a simpler method.

What is claimed is:

1. A method of measuring inter-core crosstalk of a multi-core optical fiber when light with a specific wavelength is incident thereon, the method comprising the steps of:
   acquiring a set of crosstalk values each corresponding to the associated wavelength by measuring the inter-core crosstalk of the multi-core optical fiber while changing the wavelength of the incident light in a predetermined range including the specific wavelength; and
   obtaining a value selected from a group including an average value, a median value, a mode value, a p-quantile and a variance in a statistical distribution of the inter-core crosstalk in the specific wavelength by obtaining the statistical distribution of the inter-core crosstalk, with the set of crosstalk values as a population.

2. The method of measuring inter-core crosstalk of a multi-core optical fiber according to claim 1, wherein the value selected from a group including an average value, a median value, a mode value, a p-quantile and a variance in a statistical distribution of the inter-core crosstalk in the specific wavelength is obtained by using a crosstalk value of a range in which an absolute value of $S\lambda_{range}$ becomes 4.6 dB or less when the specific wavelength is $\lambda_0$, a wavelength sweep width equivalent to the predetermined range is $\lambda_{range}$, a wavelength dependency of the statistical distribution average of the crosstalk is S, and a relation between the wavelength $\lambda$ and the crosstalk value obtained from the measurement is fitted with the following formula:

$$f_{lin}(\lambda) = XT_{lin} \cdot 10^{\frac{S(\lambda-\lambda_0)}{10}}$$

or a relation between the wavelength $\lambda$ and a crosstalk decibel value obtained from the measurement is fitted with the following formula:

$$f_{dB}(\lambda) = XT_{dB} + S(\lambda-\lambda_0),$$

wherein $XT_{lin}$ is a fitting variable corresponding to the statistical distribution average of the crosstalk, $XT_{dB}$ is a fitting variable corresponding to a dB value of the statistical distribution average of the crosstalk, $f_{lin}(\lambda)$ is a fitting formula representing a $\lambda$-dependency of the statistical distribution average of the crosstalk, and $f_{db}(\lambda)$ is a formula representing a $\lambda$-dependency of the dB value of the statistical distribution average of the crosstalk.

3. The method of measuring inter-core crosstalk of a multi-core optical fiber according to claim 1, wherein the value selected from a group including an average value; that is, $4\sigma^2$, a median value, a mode value, a p-quantile and a variance in a statistical distribution of the inter-core crosstalk in the specific wavelength is obtained when the specific wavelength is $\lambda_0$, the predetermined range is $\lambda_0-\lambda_{dev}$ to $\lambda_0+\lambda_{dev}$, a wavelength dependency of the statistical distribution average of the crosstalk is S, and the statistical distribution of the inter-core crosstalk obtained from the measurement is fitted into the following formula, with $\sigma^2$ as a variable:

$$f(x) = \begin{cases} \dfrac{10}{\ln 10} \dfrac{1}{2S\lambda_{dev}} \left[ \begin{array}{l} \left(\dfrac{1}{x} + \dfrac{1}{2\sigma^2 10^{\frac{S\lambda_{dev}}{10}}}\right)\exp\left(-\dfrac{x}{2\sigma^2 10^{\frac{S\lambda_{dev}}{10}}}\right) - \\ \left(\dfrac{1}{x} + \dfrac{1}{2\sigma^2 10^{-\frac{S\lambda_{dev}}{10}}}\right)\exp\left(-\dfrac{x}{2\sigma^2 10^{-\frac{S\lambda_{dev}}{10}}}\right) \end{array} \right] & (x > 0) \\ 0 & (x = 0). \end{cases}$$

wherein $\lambda_{dev}$ is a value for defining a wavelength range including the specific wavelength $\lambda_0$, f(x) is a statistical distribution of the measured crosstalk, and x is an argument of f(x) corresponding to the measured crosstalk.

4. The method of measuring inter-core crosstalk of a multi-core optical fiber according to claim 1, wherein the number of the crosstalk values contained in the population is at least 130 values or more.

5. The method of measuring inter-core crosstalk of a multi-core optical fiber according to claim 1, wherein, when the wavelength sweep width equivalent to the predetermined range is $\lambda_{range}$, the wavelength sweep width $\lambda_{range}$ is at least 5.2 nm or more.

* * * * *